(12) United States Patent
Bergman et al.

(10) Patent No.: US 6,446,997 B1
(45) Date of Patent: Sep. 10, 2002

(54) TRAILER FOR TRANSPORTING AN INFLATED RAFT AND RELATED EQUIPMENT

(76) Inventors: Walter F. Bergman, 628 Sage Ct., Grand Junction, CO (US) 81506; Darrell J. McKay, 2075 I Rd., Fruita, CO (US) 81521

( * ) Notice: Subject to any disclaimer, the term of this patent is extended or adjusted under 35 U.S.C. 154(b) by 0 days.

(21) Appl. No.: 09/728,864

(22) Filed: Dec. 4, 2000

(51) Int. Cl.⁷ .............................. B60P 3/10; B60P 63/00
(52) U.S. Cl. ................. 280/414.3; 296/26.15; 296/100.06; 296/10
(58) Field of Search .................... 280/414.1, 414.3, 280/656; 414/482; 296/26.15, 26.12, 100.06, 100.07, 100.08, 100.01, 3, 10

(56) References Cited

U.S. PATENT DOCUMENTS

| | | | | |
|---|---|---|---|---|
| 1,385,437 A | * | 6/1921 | Ellerman | 296/100.06 |
| 2,489,055 A | * | 11/1949 | Steinacher | 296/10 |
| 2,720,413 A | * | 10/1955 | Halverson | 296/10 |
| 3,039,629 A | * | 6/1962 | Cole | 414/532 |
| D196,499 S | * | 10/1963 | Cox | D12/101 |
| 3,266,836 A | * | 8/1966 | Taylor et al. | 410/84 |
| D223,818 S | * | 6/1972 | Shimoji | D12/97 |
| 3,717,268 A | * | 2/1973 | Snodgrass | 414/522 |
| 3,768,858 A | * | 10/1973 | Boismier | 296/10 |
| 3,900,118 A | * | 8/1975 | Kellogg | 296/57.1 |
| 4,103,926 A | * | 8/1978 | Johnston et al. | 280/414.1 |
| 4,181,351 A | * | 1/1980 | Spanke | 296/10 |
| 4,695,087 A | * | 9/1987 | Hollrock | 296/100.06 |
| 4,824,157 A | * | 4/1989 | Nielsen et al. | 296/10 |
| 5,110,021 A | * | 5/1992 | Dawson, Jr. | 296/10 |
| 6,254,169 B1 | * | 7/2001 | Arthur | 296/100.06 |

* cited by examiner

Primary Examiner—Avraham Lerner
Assistant Examiner—Matthew Luby
(74) Attorney, Agent, or Firm—Edwin H. Crabtree; Ramon L. Pizavvo; Donald W. Margolis

(57) ABSTRACT

An inflated raft trailer adapted for transporting an inflated raft to and from a river, a lake and other water recreation areas. The trailer is designed to be pulled behind a vehicle and to quickly discharge the raft from the top of the trailer into the water and quickly return the raft to the top of the trailer at the completion of a trip. The inflated raft trailer includes a trailer bed mounted on a wheeled axle. The trailer bed includes front and rear portions, first side portion and second side portions and a center portion. A vertical front frame is mounted along a length of the front portion. A movable tail gate frame, with an elongated roller mounted thereon, is hinged along a length of the rear portion of the trailer bed. The tail gate frame can be raised from a lowered position to a raised vertical position. A vertical first side frame is mounted along a length of the first side portion and a vertical second side frame is mounted along a length of the second side portion of the trailer bed. A first wing frame is hinged along the top of the length of the first side frame. A second wing frame is hinged along the top of the length of the second side frame. The first and second wing frames can be folded into a horizontal position and supported by a removable center post above the trailer bed for receiving the inflated raft thereon.

10 Claims, 2 Drawing Sheets

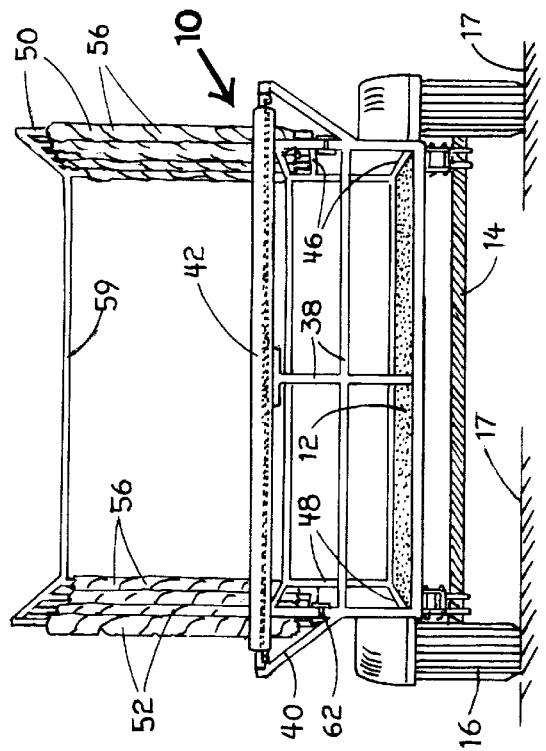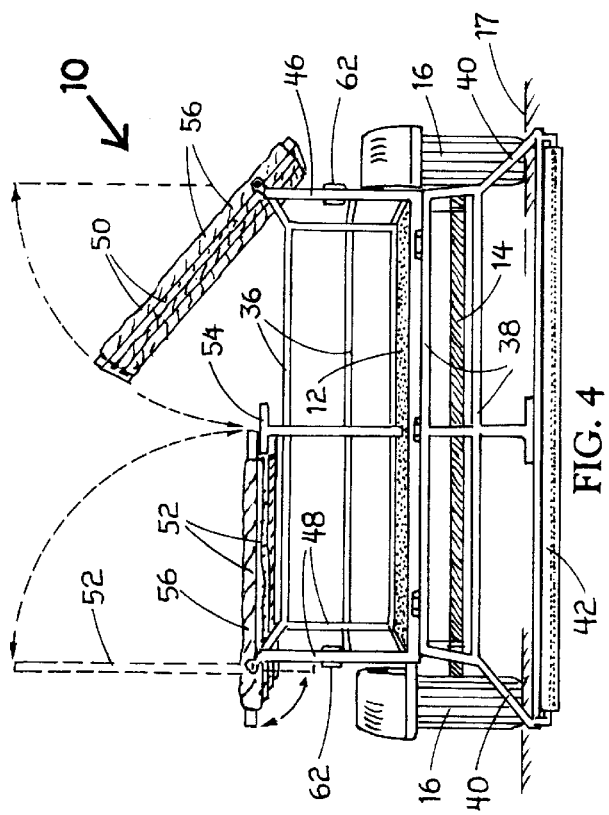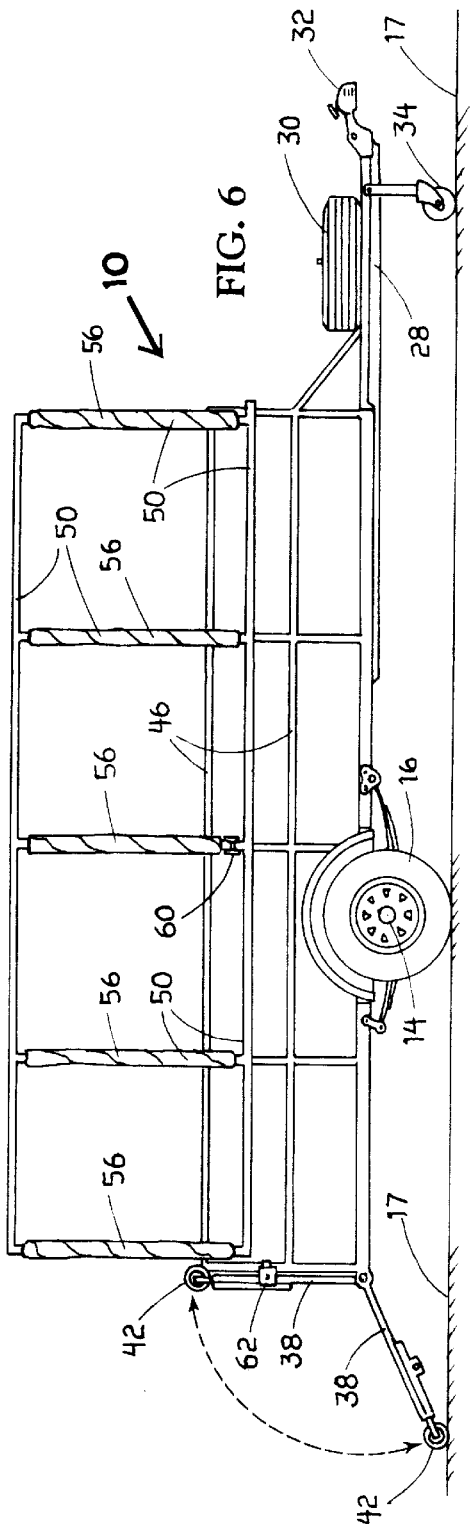

TRAILER FOR TRANSPORTING AN INFLATED RAFT AND RELATED EQUIPMENT

BACKGROUND OF THE INVENTION (a) Field of the Invention

This invention relates to boat trailers pulled by a vehicle and more particularly, but not by way of limitation, to a trailer used for transporting an inflated raft along with various types of camping and boating equipment.

(b) Discussion of Prior Art

During the past few decades in the United States and other countries rafting of rivers and streams has become a very popular outdoor sport. For example, the rafting of certain rivers in the United States require the necessary equipment for a day trip, an overnight trip, a trip of 3 and 4 days or for extended periods of up to 1 or 2 weeks. Obviously, these type of trips require a good size inflated raft for holding a number of people along with the necessary camping equipment. Heretofore, there has been no type of trailer adapted for holding the necessary camping equipment along with carrying one or more large inflatable rafts that can be quickly rolled off of the trailer and into the water at the start of the trip and then rolled onto the trailer at the completion of the river trip.

In U.S. Pat. Nos. 3,039,629 to Cole, 3,717,268 to Snodgrass, 4,103,926 to Johnston et al., Des. 196,499 to Cox and Des. 223,818 to Shimoji different types and designs of boat trailers are disclosed. In U.S. Pat. Nos. 2,489,055 to Steinacher, 2,720,413 to Halverson and 3,266,836 to Taylor et al. multi-purpose trailers and a self-unloading wagon are described. In U.S. Pat. No. 3,900,118 to Kellogg, a truck tailgate is disclosed having rollers mounted on top of the tail gate which are used for ease in loading and unloading material into a bed of the truck.

None of the above mentioned prior art patents disclose or teach the unique structural features, function, objects and advantages of the subject inflated raft trailer as described herein.

SUMMARY OF THE INVENTION

In view of the foregoing, it is a primary object of the invention to provide an inflated raft trailer which is adapted for easily transporting one or more inflated rafts to and from a river, a lake and other water recreation areas. Also, the trailer is adapted for holding various sizes and shapes of rafts thereon.

Another object of the invention is the trailer is adapted for holding various camping and boating equipment when transporting the inflated raft.

Yet another object of the trailer is that it is designed to allow the raft to be quickly discharged from the top of the trailer into the water and to allow the raft to be quickly returned to the top of the trailer at the completion of a trip. The trailer includes a tail gate frame with roller for providing ease and minimum effort in the loading and unloading of the raft on top of the trailer.

Still another object of the invention is when the trailer is not used for transporting the inflated raft and camping equipment, it can be quickly converted to a box trailer for transporting various items.

A further object of the inflated raft trailer is the trailer is rugged in construction, straight forward in mechanical design and can also be used for hauling various types of equipment and floating devices when not transporting an inflated raft and camping equipment.

The inflated raft trailer includes a trailer bed mounted on an axle with wheels. The trailer bed includes a front portion, a rear portion, a first side portion, a second side portion and a center portion. A vertical front frame is mounted along a length of the front portion. A movable tail gate frame, with an elongated roller mounted thereon, is hinged along a length of the rear portion of the trailer bed. The tail gate frame can be raised from a lowered ground position to a raised vertical position. A vertical first side frame is mounted along a length of the first side portion of the trailer bed and a vertical second side frame is mounted along a length of the second side portion of the trailer bed. A first wing frame is hinged along a top of the length of the first side frame. A second wing frame is hinged along a top of the length of the second side frame. The first and second wing frames can be folded into a horizontal position and supported by a removable center post above the trailer bed for receiving the inflated raft on top thereof. When the inflated raft is removed from the top of the trailer, the wing frames can be unfolded upwardly into a vertical position and latched to a portion of the first and second side frames for converting the raft trailer into a box trailer.

These and other objects of the present invention will become apparent to those familiar with vehicle trailers and boat trailers used for transporting various types of boats, inflatable rafts and other recreational equipment as described in the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 4 is a rear view of the inflated raft trailer with the second wing frame in a lowered horizontal position and the first wing frame in a partially lowered position. The tail gate frame is shown in a lowered position with the elongated roller received on top of the ground surface.

FIG. 5 is another rear view of the trailer with the first and second wing frames and the tail gate frame in a raised vertical position for converting the raft trailer to a box trailer for transporting various items.

FIG. 6 is a side view of the trailer as shown in FIG. 4 with the wing frames in a raised vertical position. The tail gate frame is shown in both a lowered position and a raised vertical position. When the tail gate frame is in a raised vertical position, it is secured to the sides of the first and second side frames using gate type latches.

DESCRIPTION OF THE PREFERRED EMBODIMENTS

Figure 1:
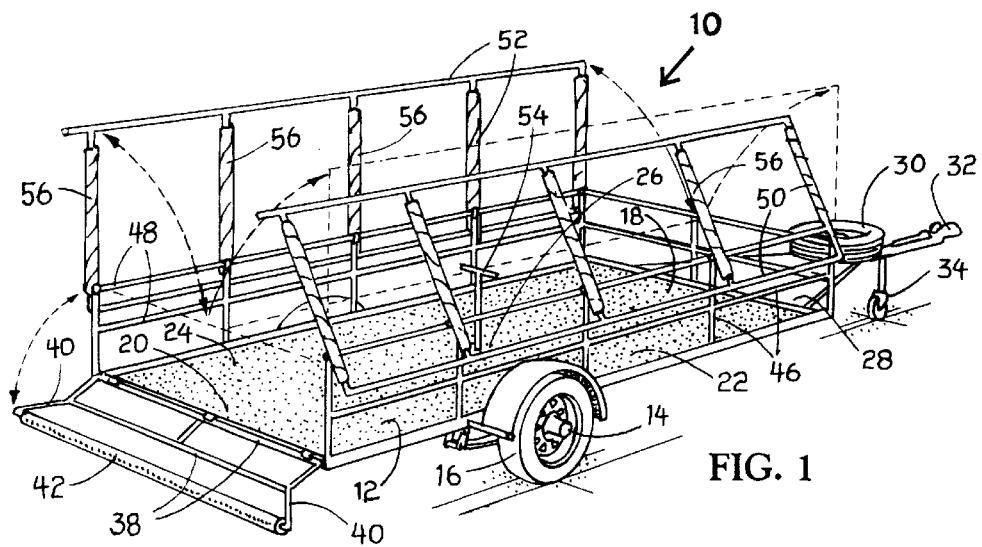
FIG. 1 is a perspective view of the inflated raft trailer. In this view, a first wing frame, hinged to a top of a first side frame, is shown in a partially lowered position. Also, a second wing frame, hinged to a top of a second side frame, is shown in a raised vertical position. A tail gate frame is shown in a lower position for engaging the ground surface.

In FIG. 1, a perspective view of the inflated raft trailer is shown and having general reference numeral 10. The raft trailer 10 includes a trailer bed 12 mounted on an axle 14 having a pair of trailer tires and wheels 16 resting on a ground surface 17. The trailer bed 12 includes a front portion 18, a rear portion 20, a first side portion 22, a second side portion 24 and a center portion 26.

Extending outwardly from the front portion 18 is a spare tire and wheel frame 28, a spare tire and wheel 30, a trailer hitch 32 and a retractable trailer hitch wheel 34. The trailer hitch wheel 34 is used for holding the trailer 10 in an upright horizontal position when the trailer hitch 32 is released from a towing vehicle. The towing vehicle is not shown in the drawings.

Figure 2:
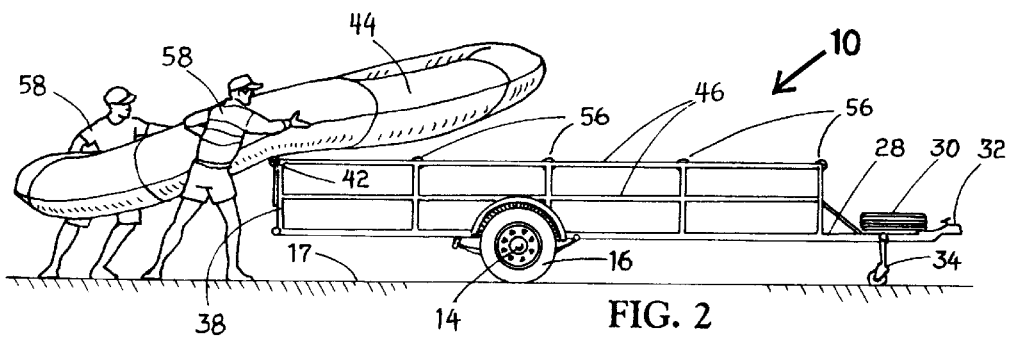
FIG. 2 is a side view of the inflated raft trailer with the first and second wing frames lowered or folded into a horizontal position. Also, the tail gate frame, with an elongated roller, is shown in a raised vertical position. The roller is used for rolling an inflated raft on to or off of the top of the folded wing frames.
Figure 3:
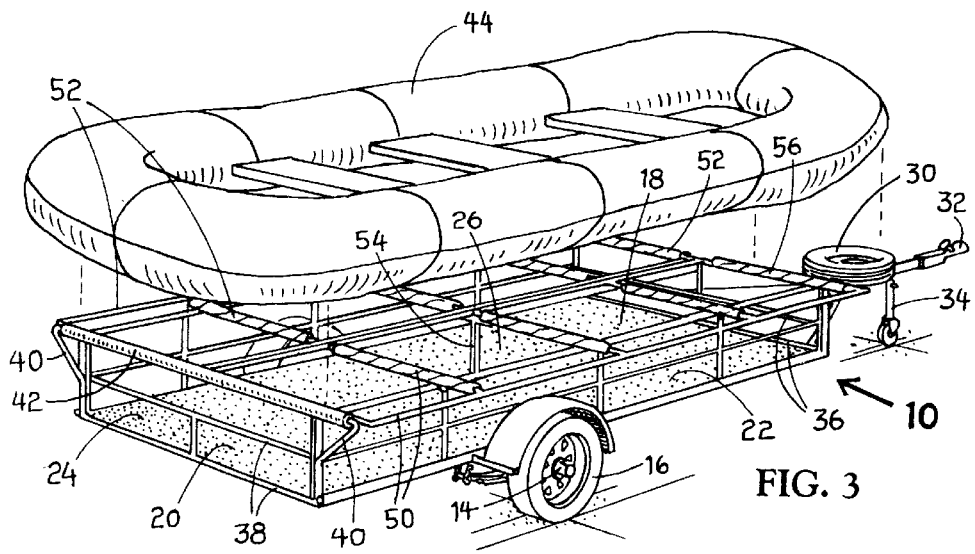
FIG. 3 is another perspective view of the trailer and similar to FIG. 1. In this view, the first and second wing frames are in a folded horizontal position. The inflated raft is shown positioned above the trailer and ready for receipt on top of the lowered wing frames.

A vertical front frame 36 is mounted along a length of the front portion 18 of the trailer bed 12 and extends upwardly therefrom. A movable tail gate frame 38 is hinged along a length of the rear portion 20 of the trailer bed 12. The tail gate frame 38 is shown in a lowered position on the ground surface 17. The tail gate frame 38 is characterized by outwardly flared arms 40 which extends past the sides of the trailer 10 when the tail gate frame 38 is in a raised vertical position as shown in FIGS. 3 and 5. The upper ends of the flared arms 40 are attached to opposite ends of an elongated roller 42. The roller 42 is extremely important in that it provides for ease in rolling and unrolling an inflated raft 44 on top of the trailer 10. The inflated raft 42 is shown in FIGS. 2 and 3.

A vertical first side frame 46 is mounted along a length of the first side portion 22 of the trailer bed 12 and extends upwardly therefrom. Also, a vertical second side frame 48 is mounted along a length of the second side portion 24 of the trailer bed 12 and extends upwardly therefrom. A first wing frame 50 is hinged along a top of the length of the first side frame 46. A second wing frame 52 is hinged along a top of the length of the second side frame 48. The first and second wing frames 50 and 52 can be lowered or folded into a horizontal position with a portion of the wing frames 50 and 52 resting on the top of a removable "T" shaped center post 54. Each of the wing frames 50 and 52 covering half of the space above the trailer bed 12. The "T" shaped center post 54 is removably mounted in the center portion 26 of the trailer bed 12 and is used for supporting the wing frames 50 and 52 when they are folded downwardly in a horizontal position as shown FIGS. 3 and 4. Also, the wing frames 50 and 52 are supported on top of the first and second side frames 46 and 48 in a folded position.

In this drawing, the first wing frame 50 is shown in a partially lowered position for converting a box trailer configuration as shown in FIGS. 5 and 6 into the inflated raft trailer. The second wing frame 52 is shown in a raised vertical position prior to being folded into a horizontal position. Prior to folding the first and second wing frames 50 and 52, the operators of the trailer 10 can begin storing miscellaneous camping and boating equipment on top of the trailer bed 12 for transporting to and from the water site.

It should be noted that a portion of the wing frames 50 and 52 are wrapped in a foam cushion material 56. The cushion material 56 provides a cushion when the bottom of the inflated raft 44 is received thereon and secured to the top of the wing frames 50 and 52 when the trailer 10 is transported from one location to another.

In FIG. 2, a side view of the inflated raft trailer 10 is shown. In this drawing, the first and second wing frames 50 and 52 have been lowered or folded into a horizontal position. Also, the tail gate frame 38, with an elongated roller 40, is shown in a raised vertical position. Obviously, when the wing frames 50 and 52 are lowered and the tail gate frame 38 is raised, any equipment stored on top of the trailer bed 12 is contained in a space below the folded wing frames and surrounded by the upright frames of the inflated raft trailer 10. The stored equipment is not shown in the drawings.

In this drawing, the roller 40 is shown engaging a portion of the bottom of inflatable raft 44 for aiding a pair of raft operators 58 in rolling the inflated raft 44 on to or off of the top of the folded wing frames 50 and 52. It should be noted that the top of the roller 40 is ½ inch or more higher than the top of the wing frames 50 and 52 with cushion material 56 thereon for ease in rolling the raft on and off the top of the folded wings.

In FIG. 3, another perspective view of the trailer 10 is illustrated which is similar to FIG. 1. Note the length of the roller 40 is approximately the same as the combined width of the wing frames 50 and 52 when the wing frames are folded into a horizontal position as shown in this drawing. The inflated raft 44 is shown positioned above the trailer 10 and ready for receipt on top of the folded wing frames 50 and 52. The inflated raft 44, when transported, can be secured to the top of the trailer 10 using cam straps or other types of securing devices to prevent movement of the raft thereon.

In FIG. 4, a rear view of the inflated raft trailer 10 is shown. The second wing frame 52 is shown in a lowered horizontal position and in dashed lines in a raised vertical position. The first wing frame 50 is illustrated in a partially lowered position. In this drawing, it can be seen that when the wing frames 50 and 52 are in a lowered folded position, a portion of the wing frames extend outwardly from the first and second side frames 46 and 48. This feature allows opposite sides of the inflated raft 44 to extend outwardly over the top of the side frames 46 and 48 and allows different sizes of inflated rafts to be received on top of the folded wing frames 50 and 52. The folded wing frames thus providing a greater surface area for supporting different sizes of rafts. The combined width of the wing frames 50 and 52 when folded is approximately the same length of the axle 14. In this view, the tail gate frame 40 is shown in a lowered position with the elongated roller 42 received on top of the ground surface 17.

In FIG. 5, another rear view of the trailer 10 is illustrated with the first and second wing frames 50 and 52 and the tail gate frame 38 in a raised vertical position. With the frames in this position, the inflated raft trailer 10 has been converted to a box trailer for transporting various items. In this illustration, a horizontal support arm 59 is shown with opposite ends removably attached to a portion of the front end of the raised wing frames 50 and 52. The support arm 59 is used to help support the wing frames in an upright horizontal position.

In FIG. 6, a side view of the trailer 10, as shown in FIG. 4, is illustrated with the wing frames 50 and 52 in a raised vertical position. The wing frames 50 and 52 are held in a vertical position using wing frame latches 60. The wing frame latches 60 are attached to a portion of the first and second side frames 46 and 48. Only the latch 60 mounted on the first side frame 46 is shown in the drawings. The latches 60 may be a gate type latch or any other similar type of latch.

In this drawing, the tail gate frame 38 is shown in both a lower position and a raised vertical position. When the tail gate frame 38 is in a raised vertical position, it is secured to the first and second side frames 46 and 48 using tail gate latches 62. The tail gate latches 62 are similar to the wing frame latches 60. The tail gate latches 62 are attached to the ends of the first and second side frames 46 and 48. These two latches 62 are shown in FIGS. 4 and 5 and one of the latches 62 is shown in FIG. 6.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An inflated raft trailer adapted for transporting an inflated raft and camping and boating equipment to and from a water site, the inflated raft trailer comprising:

a trailer bed mounted on an axle with wheels, said trailer bed including a front portion, a rear portion, a first side portion, a second side portion and a center portion;

a vertical first side frame mounted along a length of the first side portion of said trailer bed;

a vertical second side frame mounted along a length of the second side portion of said trailer bed;

a first wing frame hinged along the top of a length of said first side frame;

a second wing frame hinged along the top of a length of said second side frame, whereby said first and second wing frames can be folded from a vertical position to a horizontal position above said trailer bed, whereby said folded first and second wing frames adapted for receiving the inflated raft thereon;

a removable "T" shaped center post attached to the center portion of said trailer bed, said "T" shaped center post receiving a portion of said first and second wing frames when said wing frames are folded into a horizontal position; and a movable tail gate frame hinged along a length of the rear portion of said trailer bed, said tail gate frame having an elongated roller mounted on top of and along a length of said tail gate frame, said roller at a height corresponding to a height of said first and second wing frames when said wing frames are folded in a horizontal position for ease in rolling the inflated raft on and off of said folded first and second wing frames.

2. The trailer as described in claim 1 wherein a portion of said first and second wing frames extends outwardly from sides of said first and second side frames when folded into a horizontal position for creating additional surface area for receiving the inflated raft thereon.

3. The trailer as described in claim 1 further including wing frame latches attached to said first and second side frames, said wing frame latches used for engaging and holding said first and second wing frames in an upright vertical position when the inflated raft trailer is converted to a box trailer.

4. The trailer as described in claim 1 further including tail gate latches attached to a rear end of said first and second side frames, said tail gate latches used for engaging and holding said tail gate frame in an upright vertical position.

5. The trailer as described in claim 1 further including foam cushion material wrapped around a portion of said first and second wings frames, said cushion material providing a cushion when the inflated raft is received thereon and secured to the top of said wing frames.

6. An inflated raft trailer adapted for transporting an inflated raft and camping and boating equipment to and from a water site, the inflated raft trailer comprising:

a trailer bed mounted on an axle with wheels, said trailer bed including a front portion, a rear portion, a first side portion, a second side portion and a center portion;

a vertical first side frame mounted along a length of the first side portion of said trailer bed;

a vertical second side frame mounted along a length of the second side portion of said trailer bed;

a first wing frame hinged along the top of a length of said first side flame;

a second wing frame hinged along the top of a length of said second side frame, whereby said first and second wing frames can be folded from a vertical position to a horizontal position above said trailer bed, whereby said folded first and second wing frames adapted for receiving the inflated raft thereon;

foam cushion material wrapped around a portion of said first and second wing frames, said cushion material providing a cushion when the inflated raft is received thereon and secured to the top of said wing frames; and a movable tail gate frame hinged along a length of the rear portion of said trailer bed, said tail gate frame having an elongated roller mounted on top of and along a length of said tail gate frame, said roller at a height corresponding to a height of said first and second wing frames when said wing frames are folded in a horizontal position for ease in rolling the inflated raft on and off of said folded first and second wing frames.

7. The trailer as described in claim 6 further include a removable "T" shaped center post attached to the center portion of said trailer bed, said "T" shaped center post receiving a portion of said first and second wing frames when said wing frames are folded into a horizontal position.

8. The trailer as described in claim 6 further including wing frame latches attached to said first and second side frames, said wing frame latches used for engaging and holding said first and second wing frames in an upright vertical position when the inflated raft trailer is converted to a box trailer.

9. The trailer as described in claim 6 further including tail gate latches attached to a rear end of said first and second side frames, said tail gate latches used for engaging and holding said tail gate frame in an upright vertical position.

10. An inflated raft trailer adapted for transporting an inflated raft and camping and boating equipment to and from a water site, the inflated raft trailer comprising:

a trailer bed mounted on an axle with wheels, said trailer bed including a front portion, a rear portion, a first side portion, a second side portion and a center portion;

a vertical first side frame mounted along a length of the first side portion of said trailer bed;

a vertical second side frame mounted along a length of the second side portion of said trailer bed;

a first wing frame hinged along the top of a length of said first side frame;

a second wing frame hinged along the top of a length of said second side frame, whereby said first and second wing frames can be folded from a vertical position to a horizontal position above said trailer bed, whereby said folded first and second wing frames in a horizontal position adapted for receiving the inflated raft thereon;

a removable center post attached to the center portion of said trailer bed, said center post receiving a portion of said first and second wing frames when said wing frames are folded into a horizontal position; and a movable tail gate frame hinged along a length of the rear portion of said trailer bed, said tail gate frame having an elongated roller mounted on top of and along a length of said tail gate frame, said roller at a height corresponding to a height of said first and second wing frames when said wing frames are folded in a horizontal position for ease in rolling the inflated raft on and off of said folded first and second wing frames.

* * * * *